United States Patent
Gutkuhn et al.

(10) Patent No.: US 9,932,751 B2
(45) Date of Patent: *Apr. 3, 2018

(54) ACCESS TUNNEL SYSTEM FOR THE SHELTERED GUIDANCE OF PERSONS

(71) Applicant: Hübner GmbH & Co. KG, Kassel (DE)

(72) Inventors: Detlef Gutkuhn, Espenau (DE); Lothar Scharf, Bad Sooden-Allendorf (DE); Reinhard Hübner, Kassel (DE)

(73) Assignee: Hübner GmbH & Co. KG, Kassel (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/424,045

(22) Filed: Feb. 3, 2017

(65) Prior Publication Data

US 2017/0226768 A1     Aug. 10, 2017

(30) Foreign Application Priority Data

Feb. 5, 2016   (DE) .................. 10 2016 001 293

(51) Int. Cl.

| | |
|---|---|
| *E04H 15/36* | (2006.01) |
| *B64F 1/30* | (2006.01) |
| *E04H 15/38* | (2006.01) |
| *E04H 15/58* | (2006.01) |
| *E04H 15/48* | (2006.01) |
| *E04H 15/40* | (2006.01) |
| *E04G 21/32* | (2006.01) |
| *B64F 1/305* | (2006.01) |
| *B64F 1/00* | (2006.01) |

(52) U.S. Cl.
CPC ............. *E04H 15/38* (2013.01); *B64F 1/002* (2013.01); *B64F 1/30* (2013.01); *B64F 1/305* (2013.01); *E04G 21/3209* (2013.01); *E04H 15/405* (2013.01); *E04H 15/48* (2013.01); *E04H 15/58* (2013.01)

(58) Field of Classification Search
CPC .. B64F 1/002; B64F 1/30; B64F 1/305; B64F 1/3005; E04G 21/3209; E04H 15/36; A63B 2009/006; E04B 1/3431; E04B 1/34331; E04B 1/34336; E04B 1/348
USPC ...... 135/97, 155, 141, 903, 906, 912; 52/67, 52/79.8, 86
See application file for complete search history.

(56) References Cited

U.S. PATENT DOCUMENTS

| | | | | |
|---|---|---|---|---|
| 634,759 | A * | 10/1899 | Koch ...................... | F16L 39/00 138/102 |
| 659,114 | A * | 10/1900 | Voorhies ................. | E04H 15/44 135/120.3 |
| 2,470,337 | A * | 5/1949 | Campbell ............... | E04F 10/02 135/131 |

(Continued)

FOREIGN PATENT DOCUMENTS

| | | | | |
|---|---|---|---|---|
| DE | 10201723 A1 | * | 7/2003 | ............. B64F 1/305 |
| FR | 3018504 A1 | * | 9/2015 | ............. E04H 15/52 |

(Continued)

*Primary Examiner* — Robert Canfield

(74) *Attorney, Agent, or Firm* — Dinsmore & Shohl LLP

(57) ABSTRACT

An access tunnel system comprising at least one access tunnel for the sheltered guidance of persons to a vehicle, an aircraft, a building or the like. In accordance with the invention, a node element is provided at which the access tunnel opens and which at least one further access tunnel adjoins.

23 Claims, 2 Drawing Sheets

(56) References Cited

U.S. PATENT DOCUMENTS

| | | | | |
|---|---|---|---|---|
| 3,131,705 A * | 5/1964 | Marino | B60P 7/04 | |
| | | | 135/131 | |
| 3,148,662 A * | 9/1964 | Morrell | A01K 31/00 | |
| | | | 119/437 | |
| 3,541,626 A * | 11/1970 | Eggert, Jr. | B64F 1/3055 | |
| | | | 135/117 | |
| 3,581,331 A * | 6/1971 | Fisher et al. | B64F 1/3055 | |
| | | | 135/115 | |
| 3,629,982 A * | 12/1971 | Ballay | E04B 1/3444 | |
| | | | 135/115 | |
| 3,802,133 A * | 4/1974 | Gregory | E04B 1/3205 | |
| | | | 135/97 | |
| 4,629,182 A * | 12/1986 | Rader | A63B 9/00 | |
| | | | 482/35 | |
| 4,715,077 A * | 12/1987 | Shepheard | B64F 1/3055 | |
| | | | 138/114 | |
| 5,040,257 A | 8/1991 | Bentz | | |
| 5,084,936 A * | 2/1992 | Thomas, Jr. | B64F 1/305 | |
| | | | 14/71.5 | |
| D366,530 S | 1/1996 | Spitz | D25/18 | |
| 5,603,343 A * | 2/1997 | Larson | E04H 15/505 | |
| | | | 135/122 | |
| 5,618,246 A * | 4/1997 | Zheng | A63B 9/00 | |
| | | | 135/126 | |
| 5,620,396 A * | 4/1997 | Westphal | A63B 9/00 | |
| | | | 135/97 | |
| 6,055,692 A * | 5/2000 | Pell | B64F 1/305 | |
| | | | 14/71.5 | |
| 6,253,500 B1 * | 7/2001 | Gyllenhammar | E04B 1/3442 | |
| | | | 52/121 | |
| 6,487,743 B1 * | 12/2002 | Nicoletti | B64F 1/305 | |
| | | | 14/71.3 | |
| 6,993,802 B1 * | 2/2006 | Hone | B64F 1/305 | |
| | | | 14/69.5 | |
| 7,089,703 B2 * | 8/2006 | Brereton | A63B 9/00 | |
| | | | 472/134 | |
| 7,128,186 B2 * | 10/2006 | Ganiere | B66B 9/187 | |
| | | | 14/69.5 | |
| 7,568,435 B2 * | 8/2009 | Mosaner | B61D 17/22 | |
| | | | 105/18 | |
| 7,603,736 B2 * | 10/2009 | Hutton | B64F 1/002 | |
| | | | 14/71.5 | |
| 8,739,474 B2 * | 6/2014 | Chang | E04B 1/34378 | |
| | | | 135/128 | |
| 9,551,143 B2 * | 1/2017 | Saez Blaya | E04H 1/005 | |
| 2002/0074032 A1 * | 6/2002 | Park | E04H 15/50 | |
| | | | 135/131 | |
| 2006/0254160 A1 * | 11/2006 | Lee | E04B 1/34368 | |
| | | | 52/67 | |
| 2015/0191258 A1 | 7/2015 | Gutkuhn et al. | | |
| 2016/0376030 A1 * | 12/2016 | Gutkuhn | B64F 1/305 | |
| | | | 135/124 | |
| 2017/0001733 A1 * | 1/2017 | Larson | B64F 1/30 | |

FOREIGN PATENT DOCUMENTS

| | | | | |
|---|---|---|---|---|
| GB | 2140479 A | * | 11/1984 | E04H 3/10 |
| JP | 02129581 A | * | 5/1990 | B64F 1/002 |
| JP | 2004203104 A | * | 7/2004 | |

* cited by examiner

ACCESS TUNNEL SYSTEM FOR THE SHELTERED GUIDANCE OF PERSONS

CROSS-REFERENCE TO RELATED APPLICATION

This patent application claims priority of German Application DE 102 016 001 293.5 filed Feb. 5, 2016, the content of which are incorporated herein in its entirety.

FIELD OF THE INVENTION

The invention relates to an access tunnel system having at least one access tunnel for the sheltered guidance of persons to a vehicle, to an aircraft, to a building or the like.

BACKGROUND OF THE INVENTION

An access tunnel to an aircraft is known from a German Publication DE 10 2015 173 521 that has a plurality of tunnel elements that are connected to one another in a displaceable manner. Such access tunnel systems are used, for example, at airports and serve, for example, to guide persons from a building to a bus, from a bus to an aircraft or, for example, from a building directly to an aircraft. Such access tunnel systems should in this respect primarily serve to form a shelter for persons; in addition, the persons are led through the access tunnel system and are prevented from leaving a route, for example, to an aircraft, in an undesired manner.

Access tunnel systems that stand on the ground are known as tube-like or channel-like guideways that can be moved on the ground via rollers, for example. For example, if a vehicle such as a bus is to be connected to an access tunnel system, it is possible that a final section up to the door of the bus remains without shelter, in particular when an exit opening of the access tunnel system ends at a distance in front of the bus. If the bus has a plurality of doors, the access tunnel system has to end in front of the bus such that persons can selectively use one of the doors after leaving the access tunnel. The same applies to one or more doors in aircraft or in buildings.

SUMMARY OF THE INVENTION

The object of the invention is the further development of an access tunnel system having at least one access tunnel for the sheltered guidance of persons, wherein the access tunnel system should enable a vehicle, an aircraft or a building to be walked into in a manner as sheltered as possible. The access tunnel system should be of a flexible design such that the access tunnel system enables reaching up to a plurality of doors of a vehicle, of an aircraft or of a building in a completely sheltered manner, with distances from the doors being achieved that are as flexible as possible and differ from one another from site to site.

This object is achieved from an access tunnel system that is disclosed below. Advantageous further developments of the invention are also set forth.

The invention includes the technical teaching that a node element is provided at which the access tunnel opens and which is adjoined by at least one further access tunnel.

The core idea of the invention is the possibility of providing a branch in the access tunnel system. The node element is configured such that at least two access tunnels can be connected to the node element, with at least one access tunnel opening at the node element and the at least one further access tunnel adjoining the node element. The node element thus so-to-say forms a node point between two access tunnels and the node element, and provides the possibility of connecting at least one further access tunnel to it.

A modular design of the access tunnel system becomes possible by means of the further development of the access tunnel system in accordance with the invention comprising at least one node element and a branch can be provided at at least one further access tunnel, and preferably at at least two further access tunnels, starting from at least one access tunnel led up to the node element.

The access tunnel system is particularly advantageously configured such that a first access tunnel and at least one second access tunnel adjoin the node element. If the access tunnel system serves, for example, as a system for loading/unloading buses, for example a bus on the apron of an airport, the number of the access tunnels adjoining the node element can be determined by the number of doors of the bus. In this respect, one access tunnel is associated with each door and when a person reaches that node point via the access tunnel, for example, led toward the node element from a building or from an aircraft, the person can decide whether the further route leads through the first adjoining access tunnel or through the second adjoining tunnel depending on which door the person chooses to get on the bus. A loading/unloading system between two buses is also conceivable, for example, and a first adjoining access tunnel can lead to a first bus and a second adjoining access tunnel can lead to a second bus. The number of the access tunnels that lead to the node element can also be selected as desired. For example, when persons are to be led together from two doors of a bus or from two buses in order finally to use a single access tunnel together that adjoins the node element.

A particular advantage of the access tunnel system is achieved when the access tunnels are formed from tunnel elements that can be pushed into one another. Provision can be made that the tunnel elements are configured as conically tapering in the direction of the longitudinal axes of each tunnel element such that the tunnel elements can be pushed into one another in the manner of a plurality of shopping carts. All the tunnel elements for forming the access tunnels are particularly configured the same as one another and the access tunnel system is given a particular flexibility by the telescopic joining into one another of the plurality of tunnel elements in order to set the distance of, for example, two doors of a bus by the system of a plurality of tunnel elements that can be pushed into one another as required. The length of the access tunnel leading up to the node element can also be set as required such that the number of tunnel elements is preselected accordingly and the selected number of tunnel elements are partly pushed into one another in accordance with the tunnel length of the access tunnel to be formed. The access tunnel system is consequently formed in a very flexible manner by the corresponding design of the access tunnels by means of tunnel elements that can be pushed into one another in order to variably adapt the device for the bus loading/unloading between a bus and an aircraft, but also between an aircraft and a building or between a building and a bus with a few actions.

In accordance with another development of the access tunnel system, the node element is configured such that the access tunnel opening at the node element and two access tunnels adjoining the node element form a T shape. A V shape is also conceivable in this context and a variant of the access tunnel system is also conceivable having more than one access tunnel that leads up to the node element, and a plurality of access tunnels can be provided that adjoin the node element.

In accordance with another embodiment of the access tunnel system, at least one folding bellows can be provided that adjoins the access tunnel that in turn adjoins the node element. The folding bellows can be pivoted outward when the access tunnels adjoining the node element are to be led to doors of a bus such that said folding bellows form a quadrant in a horizontal sectional plane. If the access tunnel system is of T shape, the access tunnels adjoining the node element can extend approximately in parallel in front of the vehicle. For example, the bus and the folding bellows adjoin the ends of the access tunnels in order to allow a sheltered guidance of the persons to the vehicle up to and into the door. The horizontal outward pivotability of the folding bellows provides a further flexibility of the access tunnel system so that, for example, the access tunnel system can also be lead up to two buses that are parked at an angle with respect to one another. It is also conceivable with an articulated bus that is parked at an angle between the front bus part and the rear bus part to lead the access tunnel system up to the doors in such a flexible manner that any desired angle of, for example, two doors can be flexibly connected to the access tunnel system.

An entrance opening of the outwardly pivoted folding bellows, for example, adjoin an opening of the access tunnel, with the folding bellows configured to be connected to a last tunnel element. The folding bellows furthermore have an exit opening with which the folding bellows are arranged in front of the door of the bus. If the outwardly pivoted folding bellows have a pivot angle of, for example, 90°, the access tunnels adjoining the node element can be arranged extending in parallel in front of the vehicle, the aircraft or the building, in particular when the access tunnel system is intended to have a T shape.

The node element may also be configured with a rectangular base cross-section having at least two openings at right angles to one another. In this respect, the node element has four openings at right angles to one another, with a fourth opening being able to be brought into coverage with a further door of the bus. In accordance with this variant, a further flexibility increase of the access tunnel system results and only further access tunnels do not necessarily have to adjoin the node element since there is also the possibility that a door, for example, of a bus, directly adjoins the node element. The access tunnel that leads up to the node element can thus form a first tunnel device and the access tunnels adjoining the node element can have an angle of 90° with respect to the led up access tunnel such that the two access tunnels adjoining the node element include an angle with respect to one another of 180° and form the T shape. The door that adjoins the further opening of the node element can, for example, be disposed in the direction in which the first access tunnel is led up to the node element. If the node element is formed with a rectangular base cross-section, in particular with a square base cross-section, each of the four sides of the base cross-section has a corresponding connection. In accordance with a variant, there is also the possibility that the node element has a triangular base cross-section.

The node element is, for example, formed with a frame and with a roof element. The roof element in this respect is particularly advantageously with an awning section, in particular when the door of the bus adjoins a side of the base element. The awning section of the roof element projects beyond the door so that a person is led up to and into the bus in a sheltered manner. Further advantageously, the folding bellows have an awning element that extends at least partially over the door of the bus. The awning elements of the folding bellows are arranged at the side of the folding bellows that can be pivoted up to the door of the bus.

Finally, a further advantage is achieved when the node element has rollers on which the node element stands and by means of which the node element can be traveled. In an equally advantageous manner, the tunnel elements have rollers and if the tunnel elements are pushed into one another to minimize the length of the respective access tunnels, the total access tunnel system together with the tunnel elements and the node elements can be moved from site to site on the apron of an airport using a tow vehicle, for example.

BRIEF DESCRIPTION OF THE DRAWINGS

The invention will be described in more detail together with the description of a preferred embodiment of the invention with reference to the Figures. There are shown.

DETAILED DESCRIPTION OF THE INVENTION

Figure 1:
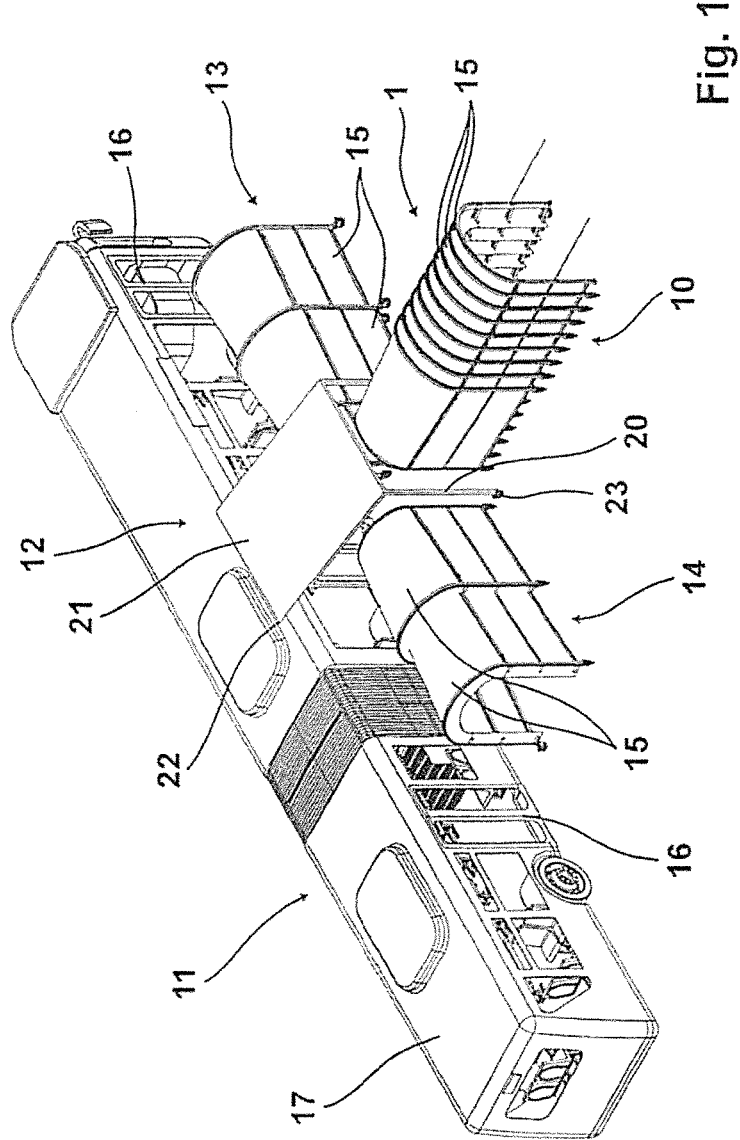
FIG. 1 is a perspective view of an access tunnel system in an arrangement in front of a bus, with a first access tunnel being pushed together.

FIG. 1 shows in a perspective view an access tunnel system 1 in an exemplary arrangement in front of a vehicle 11 that is a bus 17 such as one used at an airport. The access tunnel system 1 has an access tunnel 10 that leads up to a node element 12 of the access tunnel system 1. The access tunnel 10 is formed from a plurality of tunnel elements that are pushed into one another. The tunnel elements 15 lead up to the node element 12 such that a person can move from the access tunnel 10 into the node element 12 without interrupting a shelter.

A first access tunnel 13 and a second access tunnel 14 adjoin the node element 12 and are formed from the tunnel elements that are same as the access tunnel 10. The access tunnels 13 and 14 are lead up to doors 16 of the bus 17, for example.

The node element 12 is designed such that the access tunnels 13 and 14 lead up to the node element 12 at a right angle to the access tunnel 10 such that a person can enter into the node element 12 via the access tunnel 10 without interrupting a shelter and a person can selectively move into the first adjoining access tunnel 13 or into the second adjoining access tunnel 14 without interrupting a shelter.

The node element 12 is formed with a frame 20 and a roof element 21, with the frame 20 having rollers 23 at the bottom side on which the node element 12 stands and being able to be traveled over a ground. The roof element 21 has an awning section 22 that is guided up to or partly over the vehicle 11.

Figure 2:
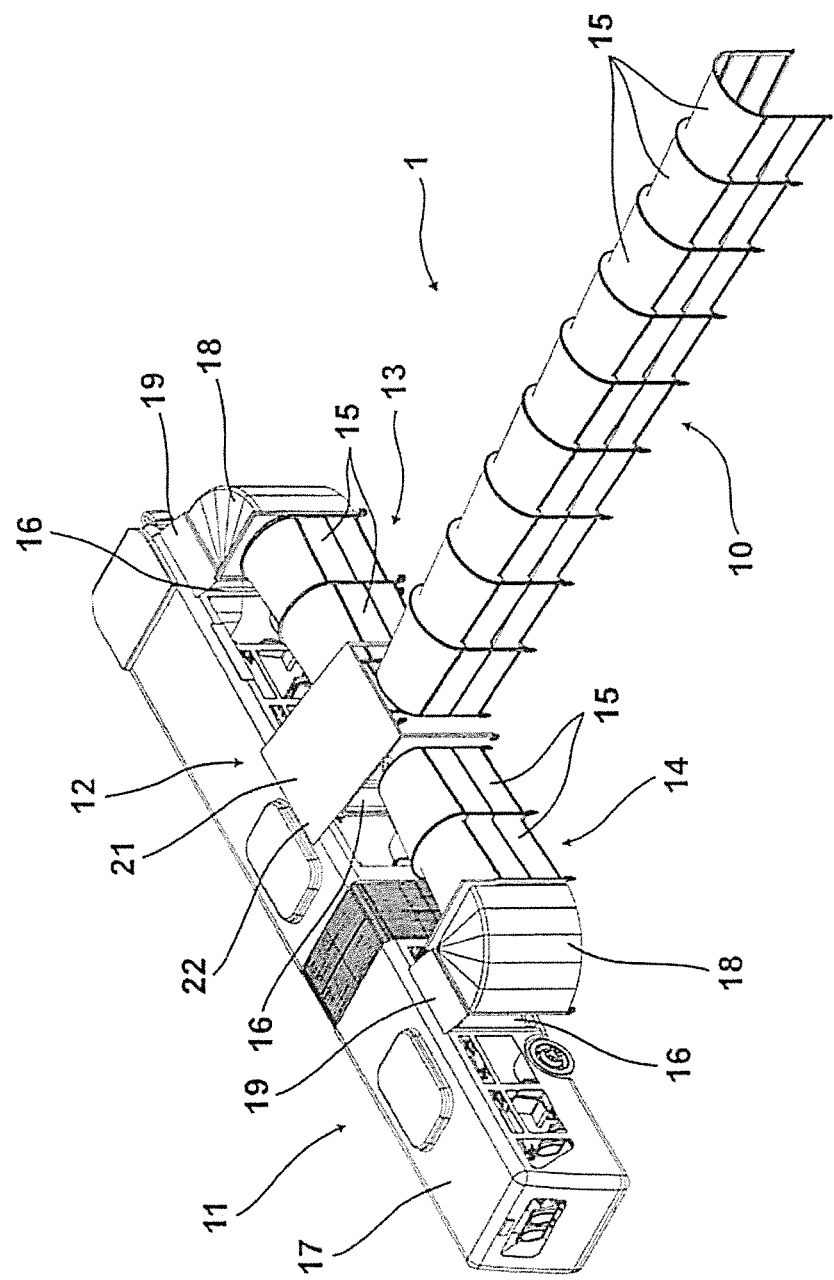
FIG. 2 shows the access tunnel system in an arrangement in front of a bus, with all access tunnels being moved out and with folding bellows being provided between a respective last tunnel element and the doors.

FIG. 2 shows another embodiment of the access tunnel system 1 with the access tunnel 10, the node element 12 and the adjoining access tunnels 13 and 14. The access tunnel system 1 is shown arranged in front of the vehicle 11 in the form of a bus 17 as an example. All the access tunnels 10, 13 and 14 have node elements 12 formed the same as one another and the access tunnel 10 is shown in an extended state in a modified form with respect to the view in FIG. 1.

Folding bellows 18 that are shown in an outwardly pivoted state adjoin the exit sides of the access tunnels 13 and 14, with the pivot angle corresponding to approximately 90°. The folding bellows 18 have been pivoted in front of the doors 16 of the bus 17 and the folding bellows 18 have awning elements 19 that cover the doors 16 or over the bus 17 such that a person can enter into the bus 17 from the access tunnel 13, 14 by means of the folding bellows 18 without interrupting a shelter.

FIG. 2 shows a further door 16 of the bus 17 with which the node element 12 has been brought into coverage, and the further door 16 is located beneath the awning 22 of the roof element 21 of the node element 12. A person can thus also enter into the bus 17 directly from the node element 12.

The embodiment of the access tunnel system 1 is shown with respect to a bus loading/unloading and the vehicle 11, forms a bus 17, for example, such as is used on the apron of an airport. The access tunnel system 1 can also serve, with the same features in accordance with the invention, as an access system for an aircraft, for example, so that stairs for fastening an aircraft can adjoin the access tunnels 13 and 14, and it is also conceivable that the access tunnel system 1 is led up to a building such that the access tunnels 13 and 14 open, for example, up to the entrance doors of a building.

The invention is not restricted in its design to the preferred embodiment provided above. A number of variants are conceivable that may make use of the solution shown with generally differently designed embodiments. All the features and/or advantages, including any construction details or spatial arrangements, originating from the claims, the description or the drawings can be essential to the invention both per se and in the most varied combinations.

REFERENCE NUMERAL LIST 1 access tunnel system
10 access tunnel
11 vehicle
12 node element
13 access tunnel
14 access tunnel
15 tunnel element
16 door
17 bus
18 folding bellows
19 awning element
20 frame
21 roof element
22 awning section
23 roller

The invention claimed is:

1. A access tunnel system for sheltered guidance of persons to a vehicle, an aircraft, or a building comprising:
at least one access tunnel;
a node element where the at least one access tunnel opens, the node element adapted to adjoin another at least one access tunnel;
a second at least one access tunnel adjoining the node element, the at least one access tunnel and the second at least one access tunnel each formed from a plurality of tunnel elements; and
wherein each tunnel element is formed in a conically tapered manner in the direction of a longitudinal axis of the tunnel element and the tunnel elements are adapted to be inserted into each other.

2. An access tunnel system in accordance with claim 1, wherein the node element is adapted for the guidance of persons at a door of a vehicle, an aircraft or a building.

3. An access tunnel system in accordance with claim 1, further comprising a folding bellow adjoining the at least one access tunnel.

4. An access tunnel system in accordance with claim 3, wherein the folding bellow is horizontally outwardly pivotable.

5. An access tunnel system in accordance with claim 4, wherein the outwardly pivoted folding bellow has an entrance opening and an exit opening, the entrance opening adjoining an opening of the at least one access tunnel and the exit opening adapted to be arranged in front of a door of a vehicle, an aircraft or a building.

6. An access tunnel system in accordance with claim 4, wherein the outwardly pivoted folding bellow has a pivot angle of about 90° such that the at least one access tunnel adjoining the node element is arranged substantially parallel in front of the vehicle, the aircraft or the building with respect to another the at least one access tunnel that is also adjoining the node element.

7. An access tunnel system in accordance with claim 3, wherein the folding bellow comprise an awning element that extends at least partially over a door of a vehicle, an aircraft or a building.

8. An access tunnel system in accordance with claim 1, wherein the node element has a rectangular base cross-section and at least three openings at about right angles to one another.

9. An access tunnel system in accordance with claim 8, wherein the node element has four openings at about right angles to one another, with one of the four openings adapted to be brought into coverage with a door of a vehicle, an aircraft or a building.

10. An access tunnel system in accordance with claim 1, wherein the node element comprises a frame and a roof element.

11. An access tunnel system in accordance with claim 10, wherein the roof element has an awning section.

12. A access tunnel system for sheltered guidance of persons to a vehicle, an aircraft, or a building comprising:
at least one access tunnel;
a node element which the at least one access tunnel adjoins;
at least two further access tunnels adjoining the node element, the at least one access tunnel and the at least two further access tunnels each formed from a plurality of tunnel elements;
wherein the node element and the tunnel elements are provided with rollers; and
wherein each tunnel element is formed in a conically tapered manner in the direction of a longitudinal axis of the tunnel element and the tunnel elements are adapted to be inserted into each other.

13. An access tunnel system in accordance with claim 12, wherein the at least two further access tunnels adjoin the node element to form a T shape with the at least one access tunnel.

14. An access tunnel system in accordance with claim 12, wherein the node element is adapted for the guidance of persons at a door of a vehicle, an aircraft or a building.

15. An access tunnel system in accordance with claim 12, further comprising a folding bellow adjoining the at least one access tunnel.

16. An access tunnel system in accordance with claim 15, wherein the folding bellow is horizontally outwardly pivotable.

17. An access tunnel system in accordance with claim 16, wherein the outwardly pivoted folding bellow has an entrance opening and an exit opening, the entrance opening adjoining an opening of the at least one access tunnel and the exit opening adapted to be arranged in front of a door of a vehicle, an aircraft or a building.

18. An access tunnel system in accordance with claim 16, wherein the outwardly pivoted folding bellow has a pivot angle of about 90° such that the at least one access tunnel adjoining the node element is arranged substantially parallel in front of the vehicle, the aircraft or the building with respect to another the at least one access tunnel that is also adjoining the node element.

19. An access tunnel system in accordance with claim 15, wherein the folding bellow comprise an awning element that extends at least partially over a door of a vehicle, an aircraft or a building.

20. An access tunnel system in accordance with claim 12, wherein the node element has a rectangular base cross-section and at least three openings at about right angles to one another.

21. An access tunnel system in accordance with claim 20, wherein the node element has four openings at about right angles to one another, with one of the four openings adapted to be brought into coverage with a door of a vehicle, an aircraft or a building.

22. An access tunnel system in accordance with claim 12, wherein the node element comprises a frame and a roof element.

23. An access tunnel system in accordance with claim 22, wherein the roof element has an awning section.

* * * * *